Dec. 14, 1954   J. DAUGHERTY ET AL   2,696,763
COUNTERBALANCING MECHANISM FOR MACHINE TOOLS
Filed Dec. 15, 1950                    5 Sheets-Sheet 2
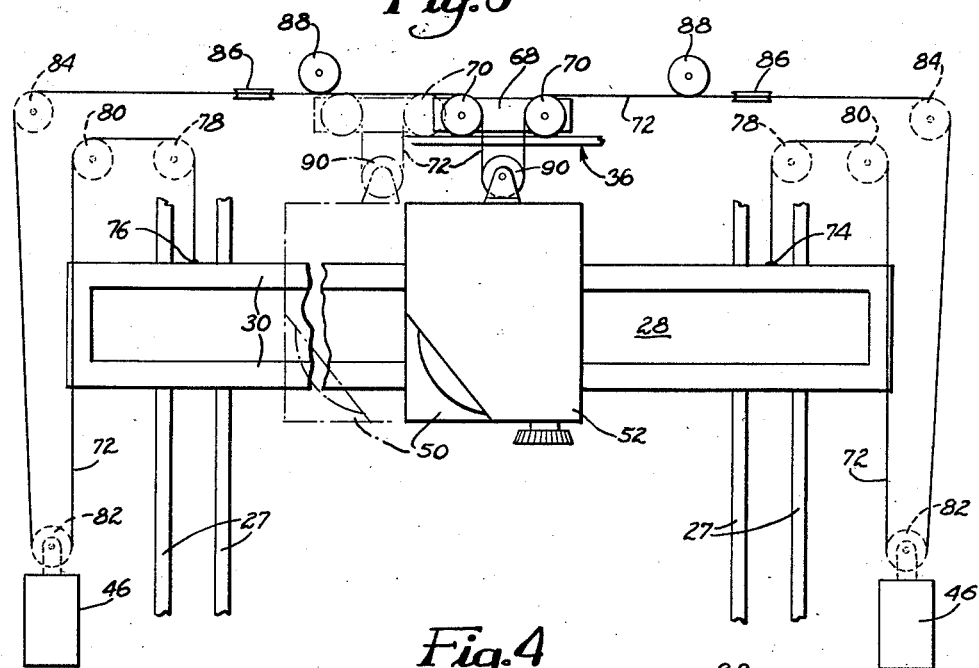
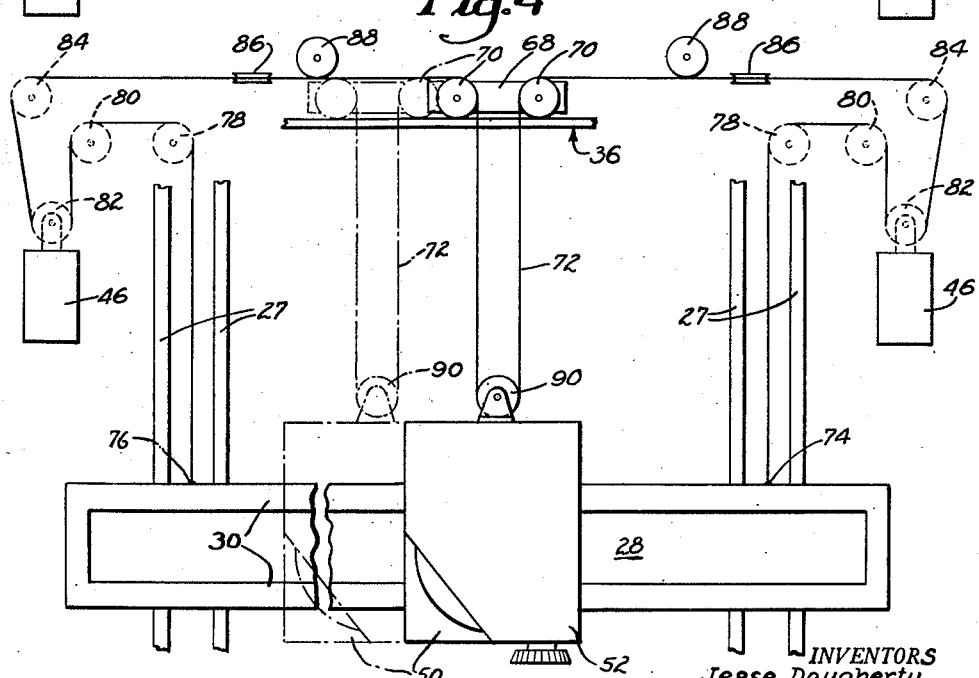
INVENTORS
Jesse Daugherty
Charles W. Ownley
BY Gordon H. Jones

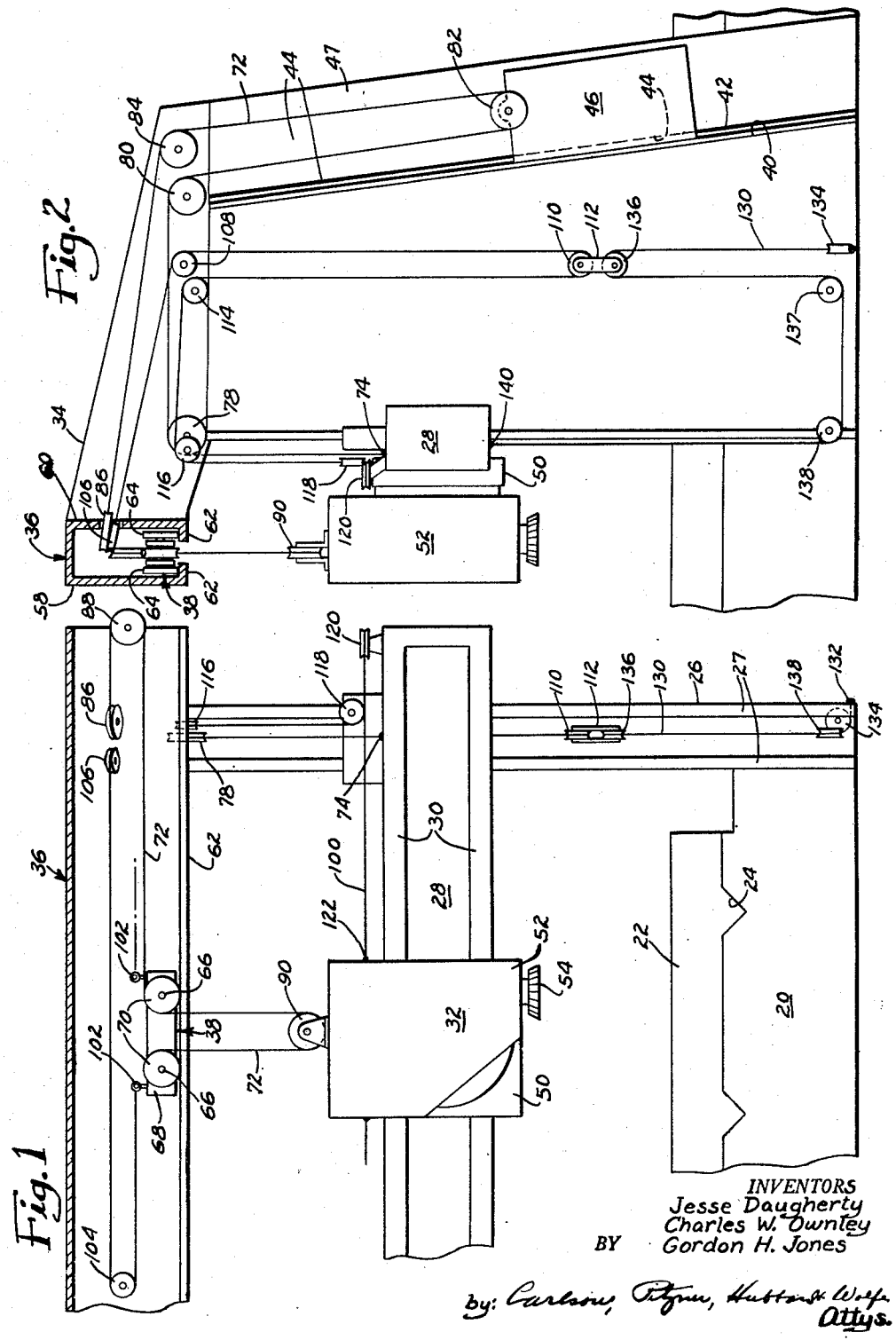

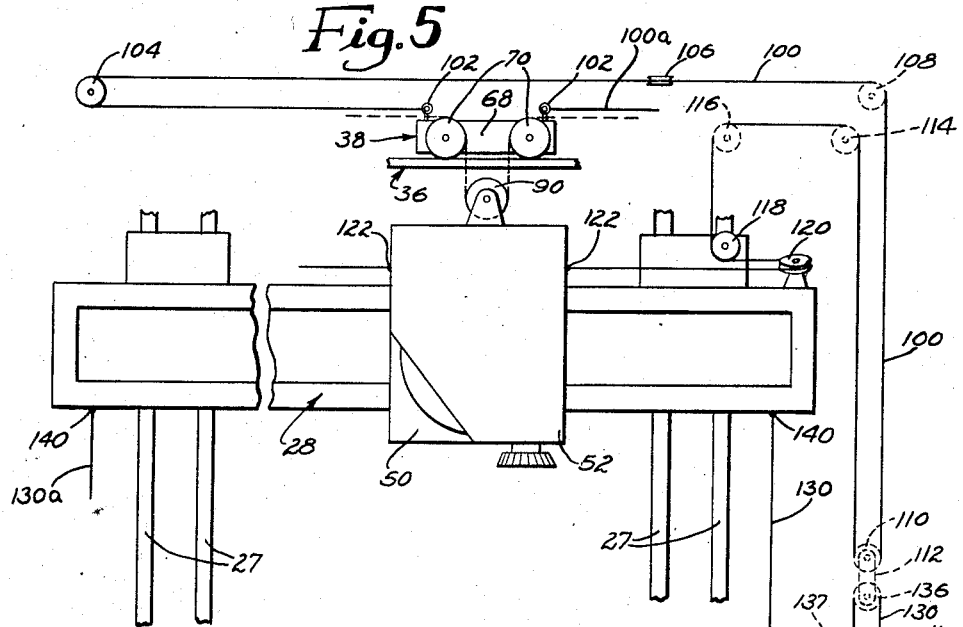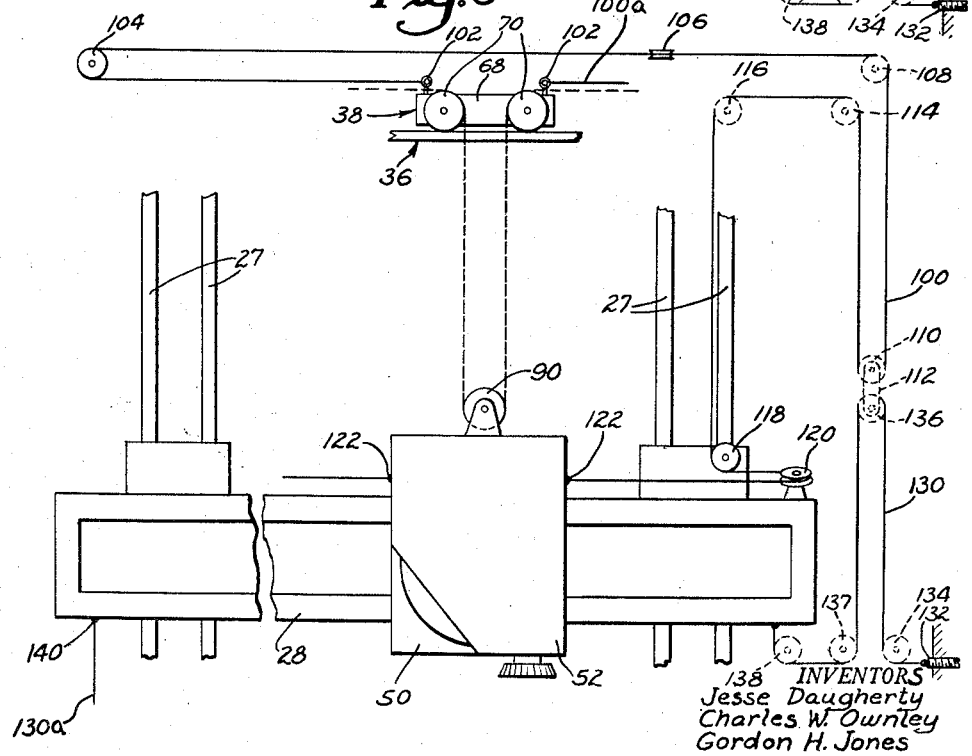

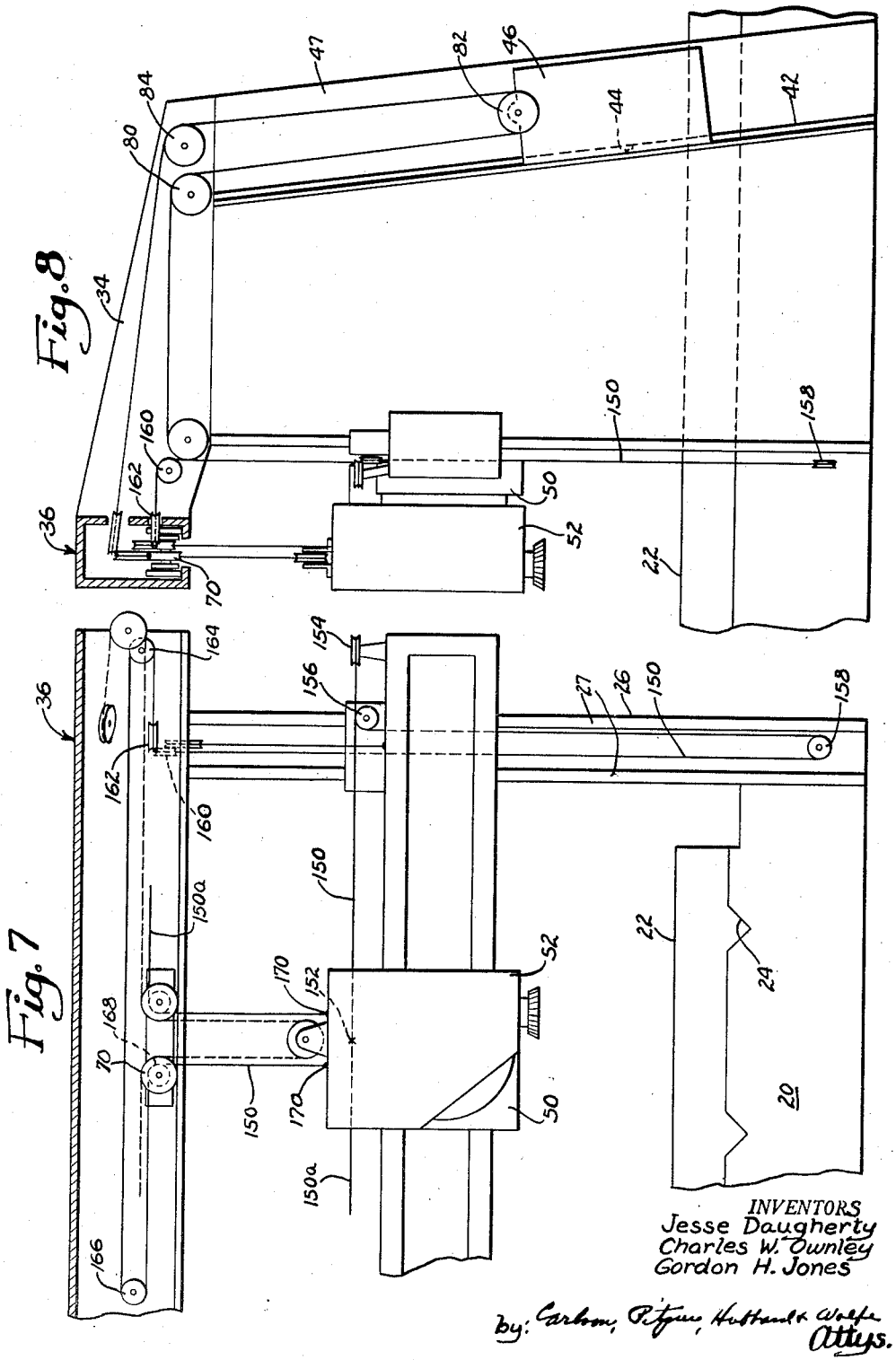

Dec. 14, 1954     J. DAUGHERTY ET AL     2,696,763
COUNTERBALANCING MECHANISM FOR MACHINE TOOLS
Filed Dec. 15, 1950     5 Sheets-Sheet 5
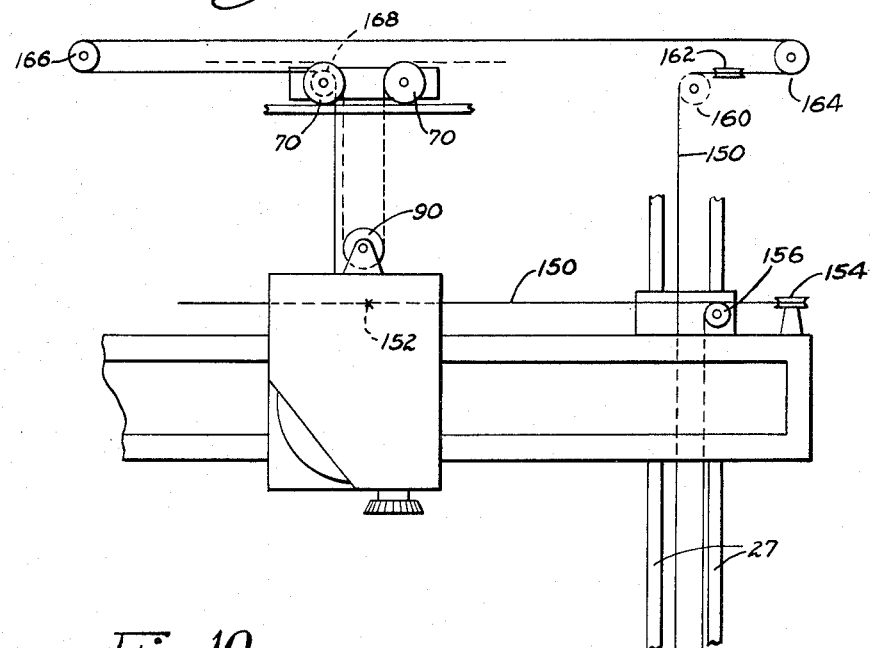
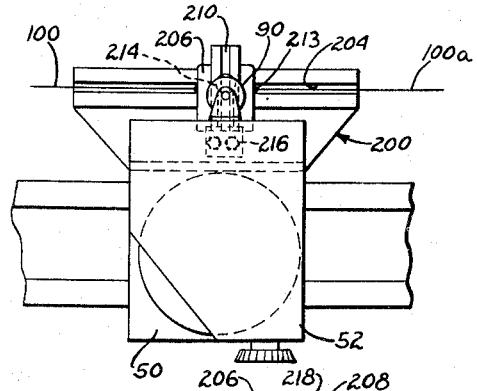
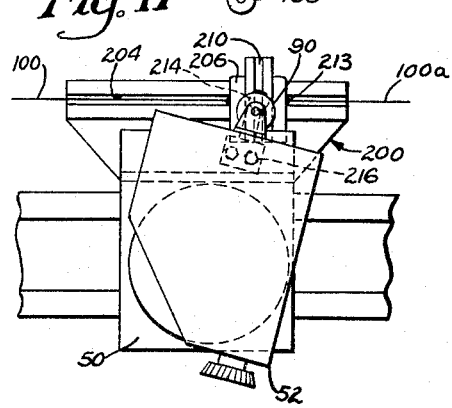
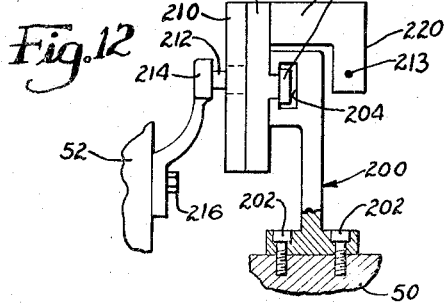
INVENTORS
Jesse Daugherty
Charles W. Ownley
Gordon H. Jones
by: Carlson, Pitzner, Hubbard & Wolfe
Attys.

United States Patent Office 2,696,763
Patented Dec. 14, 1954

2,696,763

COUNTERBALANCING MECHANISM FOR MACHINE TOOLS

Jesse Daugherty, Charles W. Ownley, and Gordon H. Jones, Fond du Lac, Wis., assignors to Giddings & Lewis Machine Tool Company, Fond du Lac, Wis., a corporation of Wisconsin Application December 15, 1950, Serial No. 201,042

29 Claims. (Cl. 90—15)

The improved counterbalancing mechanism comprising the present invention has been designed primarily for use in connection with machine tools of the type commonly known as milling machines. The invention, however, is capable of other uses and the same may, if desired, with or without modification, be employed in connection with a great variety of machine tools having moving parts thereof which require counterbalancing.

Heretofore planer type milling machines have presented relatively serious alignment problems occasioned by the weight of the headstock and its offset or overhanging relationship with respect to the supporting structure upon which it is slidably disposed. Briefly, machines of this type ordinarily include an elongated bed upon which there is supported a reciprocatory work-supporting table. A pair of vertical side housings or columns extend upwardly at the opposite sides of the bed at its mid-section, and a horizontal crossrail extends across the side housings and is vertically slidable thereon. The horizontal crossrail serves to slidably support thereon a headstock saddle and the headstock per se is mounted on the saddle either rigidly or is capable of swiveling movement thereon about a horizontal axis.

From the above brief description it will be seen that two dimensional movements of the headstock in a vertical plane are made possible; first, a transverse movement of the headstock along the axis of the crossrail so that the headstock traverses the work table laterally, and secondly, vertical movement of the headstock occasioned by vertical movement of the crossrail upon which it is mounted. Additionally, where a swivel type headstock is employed, the headstock may be tilted from its normal position about a horizontal axis to cause the tool spindle to assume an inclined position relative to the vertical.

In machines of this type, both the headstock saddle and the headstock itself are supported in an offset position from the crossrail which forms the sole support therefor. This "overhang" of the headstock from the supporting rail upon which it is mounted, and which is occasioned by its offset position, represents a considerable weight factor that must be contended with when the machine is in operation, particularly where large machines are concerned having headstocks which weigh as much as six or seven thousand pounds.

Tilting of the headstock and its supporting saddle, in the manner described above, also results in a twisting of the crossrail upon which it is mounted, and not only is there a tendency for the crossrail to become twisted in this manner, but the relatively large weight of the headstock and its supporting saddle also causes bending or sagging of the crossrail. In machines of this type, the combined weight of the crossrail, the headstock and the supporting saddle for the latter is supported by a feed screw and friction clamp which is carried in the vertical side housing or column at each end of the crossrail. Due to the extreme weight of the headstock and its supporting saddle when the clamp and saddle are positioned adjacent one end of the crossrail, the feed screw and clamp which are nearest to the headstock will deflect a considerable distance since these elements carry a greater proportion of the weight of the crossrail assembly, and thus difficulty has been encountered in maintaining the crossrail level.

The present invention has been designed to overcome the above noted limitations that are attendant upon the use of planer type milling machines of the character outlined above and, toward this end, the invention contemplates the provision of a counterbalancing system whereby the weight of the headstock, together with the saddle upon which it is mounted, may be effectively counterbalanced in any and all of the positions of which the headstock is capable of assuming. By thus effectively counterbalancing the weight of the headstock and its associated supporting saddle, twisting and sagging of the crossrail are effectively eliminated while at the same time, because of the fact that the crossrail is maintained level, wear on the guideways in which the crossrail is slidably supported is materially reduced and less power is required to feed the crossrail in its vertical movements. In addition to these advantages, since the crossrail is maintained level at all times, the headstock moves more smoothly than has heretofore been possible, and therefore more accurate machining is made possible.

The provision of an effective counterbalancing system for the headstock and its supporting instrumentalities being the principal object of the invention, another object thereof is to provide a counterbalancing system for milling machine headstocks wherein the counterbalancing effect on the headstock is maintained substantially constant throughout the wide range of displacement of which the headstock is capable.

In carrying out the above mentioned objects, the invention contemplates the provision of a counterweight cable and pulley system for counterbalancing the weight of the headstock and including an overhead trolley which assimilates substantially all of the effective weight of the headstock and its associated parts in any adjusted position of the headstock. Accordingly, it is a further object of the invention to provide a headstock counterbalancing system including a counterweight trolley, together with means whereby the trolley will at all times follow the movements of the headstock and remain in substantial vertical alignment with the latter so that the upward counterbalancing thrust applied to the headstock will not deviate from the vertical and will thus remain constant in its value.

A still further object of the invention is to provide such a counterbalancing system for swivel type headstocks including a counterweight trolley together with means whereby shifting of the center of gravity of the headstock as a whole by virtue of its turning movement on the headstock saddle or other supporting structure will be compensated for by a corresponding shifting movement of the counterweight trolley. A similar and related object is to provide a counterbalancing system of this character involving a counterweight cable and pulley system for counterbalancing the weight of the headstock, and a separate trolley draw cable and pulley system for effecting follow-up or "tracking" movements of the counterweight trolley, together with means for maintaining the tension of the draw cable of the latter system substantially constant in all of the angular positions which the headstock is capable of assuming relative to the supporting saddle upon which it is mounted.

Yet another object of the invention is to provide a counterweight system of the character briefly outlined above, including a counterweight trolley, together with means for positively effecting the follow-up or "tracking" movements of the trolley so that the movements thereof will be smooth and so that there will be no tendency for the trolley to either lead or lag behind the headstock and thus cause uneven counterbalancing.

Other objects and advantages of the invention not at this time enumerated will become readily apparent as the nature of the invention is better understood.

In the accompanying five sheets of drawings forming a part of this specification:

Figure 1 is a fragmentary front elevational view, somewhat schematic in its representation, of a planer type milling machine and showing the counterbalancing system comprising the present invention applied thereto.

Fig. 2 is a side elevational view of the structure shown in Fig. 1.

Fig. 3 is a schematic view of a counterweight cable and pulley system employed for counterbalancing the weight of the headstock and showing the latter in an elevated position.

Fig. 4 is a schematic view similar to Fig. 3 showing the headstock in a lowered position.

Fig. 5 is a schematic view of a counterweight trolley draw cable and pulley system employed in connection with the present invention and showing the position it assumes when the headstock is in an elevated position.

Fig. 6 is a schematic view similar to Fig. 5 showing the headstock in a lowered position.

Figs. 7 and 8 are front and side elevational views similar to Figs. 1 and 2 respectively, showing a modified form of counterbalancing system constructed in accordance with the principles of the invention.

Fig. 9 is a schematic view, similar to Fig. 5, showing the trolley draw cable and pulley system employed in connection with the modified form of the counterbalancing system illustrated in Figs. 7 and 8.

Fig. 10 is a fragmentary front elevational view, partly schematic in its representation, of a swivel type headstock and saddle assembly and showing a compensating mechanism associated therewith whereby shifting of the center of gravity of the headstock occasioned by tilting movements thereof on the supporting saddle are applied to the trolley draw cable and pulley system to effect a corresponding shifting of the position of the trolley.

Fig. 11 is a front elevational view similar to Fig. 10, showing the headstock in a tilted position, and Fig. 12 is a side elevational view of the structure shown in Fig. 10.

While the invention is susceptible of various modifications and alternative constructions, there is shown in the drawings and will herein be described in detail the preferred embodiments, but it is to be understood that it is not thereby intended to limit the invention to the forms disclosed, but it is intended to cover all modifications and alternative constructions falling within the spirit and scope of the invention as expressed in the appended claims.

For the purpose of exemplification, the invention has been shown and described herein as embodied in a planer type milling machine. The particular machine chosen for illustration is of relatively large size and the movable elements thereof, particularly the headstock and supporting saddle, are adapted to be displaced throughout relatively large distances while the machine is in operation. Despite this fact, the invention provides for accurate counterbalancing of the weight of the headstock, its supporting saddle and, indirectly, a portion of the crossrail assembly upon which the headstock and saddle are slidably disposed, in any adjusted position of the headstock.

General organization of the machine

Referring more particularly to the drawings, the machine constituting the exemplary embodiment of the invention is of a complex nature and, since the invention is primarily concerned with a counterbalancing means for the movable headstock of the planer type milling machine selected for illustration of the invention, only such parts of the machine as are pertinent to the operation of the counterbalancing mechanism have been disclosed. Insofar as practicable, the disclosure of these parts has been of a schematic nature.

The planer milling machine to which the counterbalancing system of the present invention has been applied involves in its general organization a main base or bed 20 (Figs. 1 and 2) on which a work-supporting table 22 is mounted for rectilinear movement by means of ways 24. A pair of columns or housings, one of which is shown at 26 extend upwardly from opposite sides of the bed 20 medially thereof and each column is provided with guideways 27 by means of which the opposite ends of a vertically movable crossrail 28 are supported and guided in their vertical up and down movements. The crossrail 28 is provided with horizontal guideways 30 for slidably supporting thereon the tool headstock assembly 32 of the milling machine for movement along the crossrail in a horizontal path.

Each column or housing 26 is provided at its upper end with a forwardly extending bracket 34 and an overhead track 36 extends between the two brackets 34 and is adapted to support thereon a trolley assembly 38, hereinafter referred to as the counterweight trolley. The rear surface 40 of each standard or housing 26 is inclined from the vertical and has secured thereto an angle piece 42 which provides a guide key designed for reception in a guideway 44 provided in a counterweight 46 which is vertically movable along the inclined surface 40 and the purpose and function of which will become clear presently. A box-like cover 47 is secured to each standard and serves to enclose therein its respective counterweight 46.

As will be made clear presently, the counterweight trolley 38 is adapted to sustain substantially the full weight of the headstock assembly 32 or, in other words, withstand all of the counterbalancing force applied to the headstock 52. It has been found expedient, if not necessary, to maintain the counterweight trolley 38 in a position of effective vertical alignment with the center of gravity of the headstock regardless of the displacement of the headstock relative to the base or bed 10 and regardless of the angular position of adjustment of the headstock on its supporting saddle or other supporting structure. Accordingly, the counterweight trolley 38 has directly associated therewith two cable and pulley systems including a system hereinafter referred to as the headstock counterbalancing cable and pulley system, and a second system hereinafter referred to as the trolley draw or trolley drive cable and pulley system. The trolley 38 also has indirectly associated therewith a third cable and pulley system which serves as a slack take-up or tensioning mechanism for the second or trolley draw cable and pulley system. These three interrelated cable and pulley systems will be described in detail subsequently.

The headstock assembly 32 which has been schematically shown herein is of a conventional type and includes the usual headstock saddle 50 which is slidably supported on the crossrail 28 and which has mounted thereon the headstock proper 52, having a tool spindle 54 adapted to be projected over the bed 20 into operative relation with the workpiece. The headstock assembly 32 shown in Figs. 1 and 2 is of the non-swiveling type in which the headstock proper 52 remains in a fixed angular position relative to the crossrail 28 with the axis of the spindle 54 extending along a vertical axis.

Disregarding the counterweight trolley 38, its supporting track 36 and the counterweights 46 which form part of the counterbalancing system of the present invention, milling machines of the type outlined above and schematically illustrated in Figs. 1 and 2 are provided with headstock assemblies such as that shown at 32 which are extremely heavy and which therefore present serious problems of alignment of the tool spindle axis. Heretofore it has been common practice to at least partially correct any misalignment caused by the unbalanced weight of the headstock assembly by corrective machining of the headstock saddle and crossrail way surfaces 30. For example, it has been found that if the way surfaces are machined to provide a crown extending completely along the crossrail 28, the sag ordinarily caused by the extreme weight of the headstock assembly will be to a certain extent neutralized. Such machining operations are, however, performed for normal or average working conditions and, since the sag caused by the weight of the headstock assembly is ordinarily greater when the headstock is medially disposed between the standards 26 than when it is close to one standard or the other, such corrective attempts to neutralize sagging of the headstock assembly 32 and consequent misalignment of the tool spindle are not reliable under varying working conditions.

The three cable and pulley systems briefly outlined above are, according to the present invention, provided for the purpose of overcoming the limitations that are attendant upon corrective machining operations as heretofore practiced for the purpose of overcoming the effect of sagging of the headstock assembly due to its extreme weight. Each of these three systems functions entirely under the control of the movements of the headstock 32 and the operation of each is dependent upon the operation of the others.

The headstock counterweight cable and pulley system

Referring now to Figs. 1 and 2, the overhead track 36 is of elongated box-like configuration and is provided with front and rear side walls 58 and 60 each having inwardly extending flanges 62 at the bottom thereof providing in effect spaced rails upon which a plurality of traction rollers 64 associated with the trolley assembly 38 are adapted to ride. The traction rollers 64 are arranged in pairs at each end of the trolley assembly and each pair thereof is carried on a trolley axle 66 suitably journaled in a rectangular trolley frame 68. A pair of counterweight pulleys 70 are rotatedly mounted on the trolley axles 66 and serve a purpose that will come clear presently.

Still referring to Figs. 1 and 2 and in addition to Figs. 3 and 4, the counterweight cable and pulley system including the trolley pulleys 70 is provided specifically for the purpose of causing the counterweights 46 to counterbalance the headstock and its associated supporting instrumentalities. Accordingly, the system includes a cable 72 having its opposite ends attached to the vertically movable crossrail 28 at points 74 adjacent the opposite ends thereof.

The counterweight cable and pulley system as shown in Figs. 3 and 4 is entirely schematic in its representation and in these views certain sections of the cable 72 which extend in a plane perpendicular to the vertical plane of movement of the crossrail 28 have been swung outwardly throughout an angle of 90° so that all portions of the cable 72 appear in these views to occupy a common plane, which is the vertical plane of movement of the crossrail 28. In Figs. 3 and 4 such pulleys as appear in side elevation in Fig. 1 are shown in full lines, and such pulleys as appear in end elevation in Fig. 1 or in side elevation in Fig. 2 are shown in dotted lines.

The isolated system of pulleys relating to the actual counterbalancing of the headstock 52 is symmetrical on each side of the headstock and only one side of the system has been illustrated in Figs. 1 and 2, but in Figs. 3 and 4 both sides of the system have been shown. The cable 72 which is attached at 74 to the crossrail 28 adjacent the right hand end thereof as viewed in Figs. 1, 3 and 4 extends vertically along the guideways 27 and passes over a pulley 78 mounted on one of the forwardly extending brackets 34. The cable passes horizontally and rearwardly within the bracket 34 and over a pulley 80 mounted adjacent the rear end of the bracket. From thence the cable 72 extends downwardly around a pulley 82 rotatably mounted on one of the counterweights 48 from whence the cable doubles back and passes over a pulley 84 mounted adjacent the rear of the bracket 34 and then extends to a pulley 86 rotatably mounted on the rear wall 60 of the track assembly 36. From the pulley 86 the cable extends over a pulley 88 carried at the extreme end of the track and from thence the cable extends horizontally within the track and passes over one of the trolley pulleys 70 from whence it extends downwardly and around a pulley 90 rotatably secured to the headstock 52 after which the cable extends around the other trolley pulley 70 and then passes over a system of pulleys at the left hand side of the headstock 32 as viewed in Figs. 1, 3 and 4 identical with the system of pulleys 78, 80, 82, 84, 86 and 88, previously described, and the individual pulleys of which have been similarly designated in the drawings. After passing over the pulley 78 at the left hand side of Figs. 1, 3 and 4, the cable is attached at 76 to the crossrail 28 adjacent the left hand end thereof.

It is to be noted from inspection of Fig. 2 that the pulley 90, which is rotatably mounted on the headstock 52, is attached to the headstock adjacent the forward regions thereof at a point well forwardly of the crossrail 28 so that the counterbalancing effect of the two counterweights 46 will be applied to the headstock at a region where a material degree of leverage is applied to the headstock tending to counterbalance the same and counteract the tendency of the headstock to sag on the rail. Since the headstock per se is not entirely symmetrical in its design, the point of attachment of the pulley 90 to the top of the headstock is made slightly to one side of the center line of the headstock, and this point of attachment is selected so as to overlie as closely as possible the center of gravity of the headstock assembly, including both the headstock 52 and the saddle 50 upon which it is mounted.

Since the rear surface 40 of each column or housing 26 is inclined at a slight angle from the vertical, the counterweights are to a slight degree slidably supported on the inclined surface of the columns although the extreme steepness of the incline is such that most of the weight of these members is applied to the cable for counterbalancing purposes.

Referring now to Fig. 3, which schematically illustrates the counterbalancing cable and pulley system just described, the headstock is shown as being in an elevated position adjacent the top of the machine and, as a consequence, the two loops within the cable 72 which pass around the pulleys 82 mounted upon the counterweights 46 are comparatively long so that the counterweights assume positions in their respective guideways 44 adjacent the bottom thereof. In the full line positions of the headstock 52 and cable 72, the headstock is shown as occupying a position substantially centrally of the crossrail 28 on which it is mounted. In the dotted line position of the headstock, it is shown as occupying a position somewhat to the left of the center of the crossrail 28; yet the counterweights 46 are shown as occupying the same positions of elevation that they would occupy when the headstock is in its central position, or in fact, in any position whatsoever along the crossrail 28. Since the cable 72 is of a predetermined fixed length and since the pulleys 78, 80, 84, 86 and 88 are fixed pulleys, movement of the headstock pulley 90 longitudinally along the crossrail 28 will merely cause tractional movement of the two pulleys 70 and the pulley 90 along the cable 72 while the extent of the cable loops passing over the pulley 82 will not be disturbed. The tendency, therefore, is for the trolley assembly 38, including the trolley frame 68, to follow the movements of the headstock 32 and, insofar as practicable, maintain a vertical position of alignment with the headstock.

In Fig. 4, the headstock is shown as being in a lowered position and in such an instance the comparatively long extent of the cable loop passing over the headstock pulley 90 will be compensated for by the comparatively shorter cable loops which pass over the two counterweight pulleys 82. In this lowered position of the headstock 52 the same phenomena relating to transverse headstock and trolley movements obtains. Transverse movement of the headstock 52 along the crossrail 28 will cause the trolley assembly 38 to follow in vertical alignment above the headstock without disturbing the elevation of the counterweights 46.

*Trolley draw cable and pulley system*

As previously stated, in the counterweight cable and pulley system described above, the tendency for the trolley assembly 38 is to follow the transverse movements of the headstock 32 along the crossrail 28 when the trolley frame 68 is otherwise free to move along the track rails 62 in either direction. However, in actual practice, particularly when the extent of the cable loop passing around the counterweight pulley 90 is relatively long, the movements of the trolley will tend to lag behind the movements of the headstock and, where a large vertical displacement of the headstock from its uppermost position is involved, the follow-up movements of the trolley will be of an uneven or jerky nature.

In order to maintain the trolley assembly 38 accurately centered above the headstock so that the counterbalancing effect of the cable 72 will be applied at all times to the headstock at a region which is in vertical alignment with the center of gravity of the headstock, a trolley draw cable and pulley system involving the use of pulleys which are, in effect, fixed for any position of elevation of the headstock, is employed. Such a system is illustrated in Figs. 1, 2, 5 and 6.

The trolley draw cable and pulley system may involve the use of two draw cables, each having one end attached to the trolley frame and the other end attached to the headstock, or it may involve an equivalent cable structure comprising a single cable having spaced attachment points on the trolley frame and a single attachment point on the headstock. If desired, a single cable may be employed having spaced attachment points on the headstock and a single attachment point on the trolley frame. Any one of these systems is the equivalent of a single continuous cable loop having an attachment point or points on the trolley frame.

The system illustrated utilizes a single cable having spaced attachment points on the trolley frame and a single attachment point on the headstock. However, since such a system has the effect of providing two cables, one for effecting trolley draw movements in one direction, and the other for effecting trolley draw movements in the other direction, the single cable shown has been theoretically divided into two sections, and one of these sections has been referred to as the cable 100 and the other as the cable 100a. The cable 100 is employed to effect unison between the movements of the headstock and trolley when the headstock moves toward the left as viewed in Fig. 1, and the cable 100a is employed to effect unison between the headstock and trolley when the headstock moves toward the right. The cables 100 and 100a function in an identical manner and each has associated therewith a similar set of pulleys. A description of the cable 100 and the pulleys associated therewith will therefore serve for the other cable 100a and its system of pulleys.

The cable 100 has one end thereof secured as at 102 to one end of the trolley frame 68, and it passes over a draw pulley 104 carried at the left hand end of the track 36 as viewed in Fig. 1. From the pulley 104 the cable 100 doubles back along the track and passes over a pulley 106 from whence it extends rearwardly to a pulley 108 mounted on the bracket 34 in the medial regions thereof. The cable 100 then extends downwardly within the housing or column 26 and passes around a tension equalizing floating pulley 110 carried on a yoke 112, and from thence the cable extends upwardly in the column 26 and passes over a pulley 114 mounted on the bracket 34 adjacent the pulley 108. The cable then extends forwardly to a pulley 116 carried at the forward end of the bracket 34 from whence it extends downwardly to a pulley 118 mounted on the crossrail 28 and horizontally to a pulley 120 also mounted on the crossrail and after passing over the pulley 120 the other end of the cable 100 is attached as at 122 to the headstock 52. The cable 100a has one end thereof attached to the trolley frame 68 as at 102 and the other end thereof attached to the headstock 52 at 122 and passes over a system of pulleys similar to those described in connection with the cable 100 and similarly designated by reference characters in the drawings. As stated above, for convenience of description, a two-cable system has been described but such a system is the equivalent of a single cable (continuous or otherwise) passing over both sets of pulleys 104, 106, 108, 110, 114, 116, 118, 120 and attached to the headstock 52 and to the trolley frame at a suitable point or points thereon.

A third cable system utilizing cables 130 and 130a is provided for the purpose of applying tension to the yoke 112 to take up slack in the cables 100 and 100a by drawing the pulleys 110 tightly against the loops created in the respective cables with which they are associated. Thus, when the crossrail 28 is clamped at any desired elevation, the pulley 110 will, in effect, constitute a fixed pulley as will the pulleys 118, 120, both of which are mounted on the crossrail together with all of the other pulleys in the system.

With the crossrail 28 clamped in any desired position of adjustment and with all of the pulleys in the trolley draw cable and pulley system constituting, in effect, fixed pulleys, it will be seen that movement of the headstock 52 to the left, as viewed in Figs. 4 and 5, will cause the cable 100 to pass or feed around all of the pulleys associated with it and thus draw the trolley frame 68 and consequently the entire trolley assembly 38 to the left in unison with the movements of the headstock. Similarly, movements of the headstock to the right, as viewed in Figs. 4 and 5, will cause a corresponding follow-up or "tracking" movement of the trolley assembly 38 to the right under the influence of the cable 100a.

*The slack take-up system for the trolley draw cable*

The cable and pulley system by means of which the cables 100 and 100a are maintained taut involves the use of the two cables 130 and 130a, and each of these cables has one end thereof attached by means of a tension adjusting screw 132 to a point adjacent the bottom of the housings or columns 26. From its point of attachment, each cable extends around a pulley 134 and from thence upwardly in the column around a tension equalizing floating pulley 136 carried by the yoke 112 and from thence downwardly beneath pulleys 137 and 138 mounted adjacent the bottom of the column. From the pulley 138 each cable extends upwardly and is attached to the underneath side of the crossrail 28 as at 140.

When the crossrail 28 and the headstock 52 assume elevated positions, the downwardly extending loop existing by virtue of the three pulleys 108, 110 and 114 will be relatively long, while the loop existing by virtue of the three pulleys 134, 136 and 137 will be relatively short and the length of the cable 130 is such that regardless of the position of the crossrail 28, tension will be maintained upon the yoke 112, tending to maintain the cables 100, 100a of the trolley draw cable and pulley system and the cables 130 and 130a of the slack take-up cable and pulley system under tension at all times.

As shown in Fig. 6, when the headstock 52 and crossrail 28 are in a lowered position, the extent of the cable loop existing by virtue of the cables 108, 110 and 114 is relatively short, while the loop existing by virtue of the cables 134, 136 and 137 is relatively long. The two cable systems utilizing the cables 100 and 100a and the cables 130 and 130a, respectively, are thus compensating systems and regardless of the position of the headstock and crossrail, tension between the two cable systems is maintained by application of tension to the yoke 112.

*Operation of the multiple cable system*

The interrelation between the three cable systems described above will become apparent from a description, first, of the various cable movements that take place when the headstock 52 is moved in a horizontal direction, and second, from a description of these movements when the headstock is moved in a vertical direction.

HORIZONTAL MOVEMENT OF THE HEADSTOCK 52

Horizontal movement of the headstock 52 along the crossrail 28 when the latter is clamped in an elevated position, as for example as shown in Fig. 3, from its full line position to its dotted line position, will not affect the disposition of the two counterweights 46. Such movement of the headstock will be accompanied by a corresponding follow-up or tracking movement of the trolley assembly 38 and, since the trolley will be maintained in the vertical plane of the headstock due to the operation of the trolley draw cable and pulley system, the position of the loop from which the headstock is suspended, and existing by virtue of the pulleys 70 and 90, will merely shift to the left since the length of the cable 72 is constant and since the pulleys 78, 80, 84, 86 and 88 are all fixed pulleys.

The trolley draw cables 100 and 100a will, upon movement of the headstock 52 to the left from its full line to its dotted line position, as shown in Fig. 5, will merely feed around the various fixed pulleys 104, 106, 108, 110, 114, 116 and 118 with which they are associated so that the end of the cable 100 will draw the trolley frame 68 to the left. The trolley draw cable 100a will likewise pass over the various cables with which it is associated and move endwise in the tortuous path provided for it by these pulleys. Obviously, movement of the headstock to the right, as viewed in Fig. 5, will cause the cable 100a to draw the trolley frame 68 to the right while the cable 100 will simply follow the movements of the trolley frame and headstock.

The counterweight cable 72 and the trolley draw cables 100 and 100a function in a similar manner when the cross rail 28 and headstock 52 are in a lowered position and horizontal shifting movements of the headstock 52 will not disturb the position of the counterweights 46.

VERTICAL MOVEMENT OF THE HEADSTOCK 52

Assuming that the headstock 52 is moved from the elevated position shown in Fig. 3 to the lowered position shown in Fig. 4, such movement being occasioned by the downward movement of the crossrail 28, it will be seen that since the pulleys 78, 80, 84, 86, 88 and 70 may be regarded as fixed pulleys insofar as this vertical movement of the crossrail is concerned, elongation of the loop existing by virtue of the trolley pulley 70 and the headstock pulley 90 will cause the loops existing by virtue of the pulleys 80, 82 and 84 to become shortened correspondingly, thus raising the counterweights 46. Since the single loop in the vicinity of the headstock pulley 90 "feeds," so to speak, into the loops existing in the vicinity of the counterweight pulleys 82, the extent of elevation of the counterweights 46 will be substantially one-half of the extent of lowering movement of the headstock and crossrail.

The effect on the trolley draw cable and pulley system involving the cables 100 and 100a upon lowering of the crossrail 28 and headstock 52 will be to take up on the loop existing by virtue of the pulleys 108, 110 and 114. Since the pulleys 118 and 120 are mounted directly on the crossrail 28 downward movement of these pulleys will cause the cables 100 and 100a to be fed from the loop portions which pass over the yoke pulleys 100, thus elevating the yokes 112 without disturbing the lateral position of the trolley assembly 38.

Upon upward movement of the yokes 112, the cable system involving the cables 130 will yield and, as the crossrail 28 moves downwardly, the cables 130 and 130a will be fed to the loops existing by virtue of the pulleys 134, 136 and 137. The tension of the cables 130 and 130a is maintained constant by means of the adjustments existing at the points of attachment 132 between these cables and the stationary framework of the machine.

*Alternative trolley draw cable and pulley system*

Referring now to Figs. 7, 8 and 9, an alternative form of trolley draw cable and pulley system is shown. As in the case of the trolley draw cable and pulley system of Figs. 5 and 6, two draw cables, each having one end attached to the trolley frame and the other end attached to the headstock, may be employed or a single equivalent cable structure wherein the cable is attached to the headstock and trolley frame at suitable points thereon may be employed. The system illustrated utilizes two cables 150 and 150a. These cables 150 and 150a perform similar functions and each has associated therewith an identical set of pulleys so that a description of the cable 150 and its cooperating pulleys is deemed to be sufficient to an understanding of the operation of the cable 150a.

The cable 150 is attached as at 152 to the rear side of the headstock 52, and from its point of attachment it extends horizontally parallel to the crossrail and passes over a pulley 154 mounted on the crossrail. The cable then passes to a pulley 156 likewise mounted on the crossrail after which it extends downwardly and around the pulley 158 secured to the lower end of the column 26. The cable then doubles back and extends upwardly to a pulley 160 mounted on the forward end of the bracket 34 and passes to a pulley 162 adjacent the pulley 160, and from thence it passes over a pulley 164 mounted within the track 36. The cable then extends to the opposite end of the track and passes around a pulley 166 carried within the track 36. The cable 150 then extends over a pulley 168 which is concentric with one of the pulleys 70 of the trolley assembly 38 and downwardly from the pulley 168 and is attached at 170 to a point adjacent the top of the headstock 52.

From the above description, it will be seen that the cable system of Figures 7, 8 and 9 may be substituted in place of the trolley draw cable system and the slack take-up cable system involving the use of cables 100, 100a and 130, 130a of Figures 5 and 6. With the crossrail 28 clamped in a selected fixed position, all of the pulleys 154, 156, 158, 160, 162, 164 and 166 of the system are, in effect, fixed pulleys and, since the length of the cable 150 is constant, any movement of the headstock 52 along the crossrail 28 will apply a force to the pulley 168 on the trolley frame 68 tending to move the entire trolley to the left so that the latter remains in the vertical plane of the headstock 52 throughout all of its increments of motion. Movement of the headstock 52 to the right is likewise accompanied by a corresponding movement of the trolley assembly 38 under the influence of the cable 150a.

The crossrail 28 and headstock 52 mounted thereon may be moved vertically in either direction without destroying the effectiveness of the trolley draw cable and pulley system. Any elongation or shortening of the span of the cable 150 or 150a existing between its point 170 of attachment to the headstock 52 and the pulley 168, is accompanied by a corresponding shortening or lengthening, respectively, of the spans of the cable existing between the pulleys 156 and 158 and between the pulleys 158 and 160.

*Compensating mechanism for headstock tilting*

The trolley draw cable and pulley systems illustrated in Figs. 5 and 6, and the modified form of trolley draw system illustrated in Fig. 9 are shown as being applied to a headstock which is fixed relative to its supporting saddle so that the axis of the tool spindle 54 is at all times vertical, regardless of the adjusted position of the headstock. Where swivel type headstocks are employed which are capable of swinging movements relative to the headstock saddle about a horizontal axis, the problem of causing the trolley assembly 38 to properly track or follow the movement of the headstock assembly along the crossrail 28 is complicated by geometrical considerations arising from the fact that tilting of the headstock 32 in a counterclockwise direction as viewed in Fig. 1 will elevate the point of attachment 122 of the cable 100 while tilting of the headstock in the other direction will lower the point of attachment. The same consideration applies when the headstock of Fig. 7 is tilted in either direction so as to displace the point of attachment 152 of the cable 150.

In order to maintain the attachment points 122, in the case of the trolley draw system of Figures 5 and 6, or the attachment point 152 of the trolley draw system of Figure 9, at the same elevation and thus maintain the span or run of the cables 100, or 100a leading from the headstock 52, substantially horizontal at all times so as to avoid stretching of the cables 100 or 100a upon tilting of the headstock 52 upon its saddle 50, the arrangement illustrated in Figures 10, 11 and 12 may be employed. Accordingly a bracket 200 is secured in any suitable manner, as for example, by means of screws 202, to the upper side of the headstock saddle 50 and is provided with a horizontal T-slot 204 therein. A slide 206 is provided with a key 208 which extends into the T-slot 204 thus connecting the slide 206 to the bracket 200 for sliding movement horizontally therealong. A vertical slot 210 formed in the front face of the slide is adapted to receive therein a pin 212 carried at the upper end of a bracket 214 which is secured as at 216 to the rear face of the headstock 52. An L-shaped bracket 218 is provided on the slide 206 and overlies the bracket 200 and is provided with a depending arm 220 to which one end of the cable 100 (Fig. 5) or of the cable 150 (Fig. 9) may be attached as at 213.

From the above description it will be seen that whenever a swivel type headstock is employed in connection with the trolley draw systems of Figs. 5 or 9, as the case may be, the end of the cable 100 or 150 is attached to the depending arm 220 of the bracket 218 of Fig. 12 instead of directly to the headstock itself, and in such an instance tilting movement of the headstock in either direction, as for example, from the position it assumes in Fig. 10 to the position it assumes in Fig. 11, will cause the pin 212 carried on the bracket 214 to displace the slide 206 an amount substantially commensurate with the shifting movement of the headstock pulley 90 so that the suspending loop of the counterweight cable 72 passing around the headstock pulley 90 will remain substantially vertical. In other words, shifting of the slide 206 will cause a shifting movement of the trolley assembly 38 to an extent which is commensurate with the shifting movement of the headstock pulley 90 occasioned by tilting of the headstock.

We claim as our invention:

1. The combination with a machine having a tool holder movable linearly in a horizontal path, of a track disposed above the level of said tool holder and overlying the path of movement of the tool holder coextensively therewith, a trolley movable on said track and adapted to traverse the same, a counterweight cable and pulley system including a pair of pulleys mounted on said trolley, a suspension pulley mounted on said tool holder, and a cable passing over said trolley pulleys and having a suspension loop therebetween passing around said suspension pulley, and a pair of counterweights carried by said cable and effective on each side of said trolley pulleys to apply equalized tension to said suspension loop.

2. The combination with a machine having a tool holder movable linearly in a horizontal path, of a track disposed above the level of said tool holder overlying the path of movement of the tool holder coextensively therewith, a trolley movable on said track and adapted to traverse the same, a counterweight cable and pulley system including a pair of pulleys mounted on said trolley, a suspension pulley mounted on said tool holder, and a cable passing over said trolley pulleys and having a suspension loop therebetween passing around said suspension pulley, a pair of counterweights, a pulley mounted on each counterweight and means providing a pair of suspension loops in said cable on opposite sides of said trolley pulleys, respectively, said suspension loops supporting said counterweight pulleys and equalizing the tension in said first mentioned suspension loop.

3. The combination with a machine having a tool holder movable linearly in a horizontal path, of a track disposed above the level of the tool holder and overlying the path of movement of the tool holder coextensively therewith, a trolley movably mounted on said track and adapted to traverse the same, a pair of pulleys mounted on said trolley, a suspension pulley on said tool holder, a cable passing over said trolley pulleys and providing a suspension loop therebetween passing around said suspension pulley, a pair of counterweights carried by said cable and effective on each side of said trolley pulleys to apply equalized tension to said suspension loop, and means operatively connecting the tool holder and trolley in driving relationship for causing the trolley to track the movements of the tool holder.

4. The combination with a machine having a tool holder movable linearly in a horizontal path, of a track disposed above the level of the tool holder and overlying the path of movement of the tool holder coextensively therewith, a trolley movably mounted on said track and adapted to traverse the same, a pair of pulleys mounted on said trolley, a suspension pulley mounted on said tool holder, a cable having one end thereof secured to a fixed point on the machine, said cable passing over one of the pulleys on said trolley, around the suspension pulley and from thence over the other pulley on said trolley, and a counterweight supported by said cable adjacent the other end thereof.

5. The combination with a machine having a tool holder movable linearly in a horizontal path, of a track disposed above the level of the tool holder and overlying the path of movement of the tool holder coextensively, a trolley movably mounted on said track and adapted to traverse the same, a pair of pulleys mounted on said trolley, a suspension pulley mounted on said tool holder, a cable having its opposite ends secured to fixed points on the machine, said cable passing over said trolley pulleys and around said suspension pulley, thereby forming a suspension loop for the latter, and a pair of counterweights supported by said cable on opposite ends of said trolley.

6. The combination with a machine having a vertically movable crossrail, and a tool holder slidably disposed on said crossrail and adapted to traverse the latter of a track disposed above the level of the tool holder when the crossrail is in its uppermost position and overlying the path of movement of the tool holder coextensively, a trolley movably mounted on said track and adapted to traverse the same, a pair of pulleys mounted on said trolley, a suspension pulley mounted on said tool holder, a cable having its opposite ends secured to said crossrail, said cable passing over said trolley pulleys and having a suspension loop therebetween passing around said suspension pulley, and a pair of counterweights carried by said cable and effective on each side of said trolley pulleys to apply equalized tension to said suspension loop.

7. The combination with a machine having a vertically movable crossrail, and a tool holder slidably disposed on said crossrail and adapted to traverse the latter, of a track disposed above the level of the tool holder when the crossrail is in its uppermost position and overlying the path of movement of the tool holder coextensively, a trolley movably mounted on said track and adapted to traverse the same, a pair of pulleys mounted on said trolley, a suspension pulley mounted on said tool holder, a cable having its opposite ends secured to said crossrail, said cable passing over said trolley pulleys and having a suspension loop therebetween passing around said suspension pulley, a pair of counterweights, a pulley mounted on each counterweight, and means providing a suspension loop in said cable for each of said counterweight pulleys on opposite sides of the trolley pulleys.

8. The combination with a machine having a tool holder movable linearly in a horizontal path, of a track disposed above the level of the tool holder and overlying the path of movement of the tool holder coextensively therewith, a trolley movably mounted on said track and adapted to traverse the same, a pair of pulleys mounted on said trolley, a suspension pulley mounted on said tool holder, a cable having its opposite ends secured to fixed points on the machine, said cable extending over said trolley pulleys and around said suspension pulley, thus providing a suspension loop for the latter pulley, a pair of counterweights, a pulley mounted on each counterweight and means providing a suspension loop in said cable for each of said counterweight pulleys on opposite sides of the trolley pulleys.

9. The combination with a machine having a tool holder movable linearly in a horizontal path, of a track disposed above the level of the tool holder and overlying the path of movement of the tool holder coextensively therewith, a trolley movably mounted on said track and adapted to traverse the same, a pair of pulleys mounted on said trolley, a suspension pulley mounted on said tool holder, a pulley fixedly mounted adjacent each end of said track, a cable having its opposite ends secured to respective fixed points on the machine and passing over said fixedly mounted pulleys, over said trolley pulleys, and around said suspension pulley, thus providing a suspension loop for the latter, a pair of counterweights, a pulley mounted on each counterweight, and means disposed between each end of the cable and the adjacent fixed pulley providing a suspension loop in said cable for one of said counterweight pulleys.

10. The combination with a machine having a vertically movable crossrail and a tool holder slidably disposed on said crossrail and adapted to traverse the latter, of a track disposed above the level of the crossrail and overlying the path of movement of the tool holder coextensively, a trolley movably mounted on said track and adapted to traverse the same, a counterweight cable and pulley system including a pair of pulleys mounted on said trolley, a suspension pulley mounted on said tool holder, a pulley fixedly mounted adjacent each end of said track, a cable having its opposite ends secured to said crossrail adjacent the opposite ends of the latter respectively, said cable passing over said fixedly mounted pulleys and said trolley pulleys and passing around said suspension pulley, thus providing a suspension loop for the latter, a pair of counterweights, a pulley mounted on each counterweight, means disposed between each end of the cable and the adjacent fixedly mounted pulley providing a suspension loop in said cable for one of said counterweight pulleys, and a trolley draw cable and pulley system including a plurality of fixed pulleys, a plurality of pulleys mounted on said crossrail, a plurality of pulleys on said trolley, and a cable passing around said pulleys and fixed to said tool holder.

11. The combination with a machine including a pair of spaced side columns, a crossrail bridging said side columns and vertically movable thereon, and a tool holder slidably supported on said crossrail and offset forwardly therefrom and adapted to traverse the same in any vertical position of the crossrail, of means for counterbalancing the weight of said tool holder comprising a track disposed above the level of the crossrail and overlying the path of the movement of the tool holder coextensively, a trolley movably mounted on said track, a pair of pulleys mounted on said trolley, a suspension pulley mounted on said tool holder, a pulley mounted on said track at each end thereof, a guide pulley mounted on said track adjacent each track pulley, a pair of counterweights, a pulley mounted on each counterweight, a cable having its opposite ends secured to said crossrail adjacent the opposite ends thereof, respectively, said cable passing over said guide pulley, said track pulley and said trolley pulleys, and passing around said suspension pulley, thereby providing a suspension loop for the latter, and a pair of pulleys mounted on each of said side columns, and offset rearwardly from said track and over which said cable extends, each of said pair of pulleys providing a suspension loop in said cable for one of said counterweight pulleys.

12. The combination with a machine having a tool holder movable linearly in a horizontal path, of a track disposed above the level of said tool holder and overlying the path of movement of the latter coextensively, a trolley movable on said track and adapted to traverse the same, a counterweight cable and pulley system including a pulley on said trolley, a counterweight, and a cable passing over said pulley and operatively connected to said counterweight and tool holder, a trolley draw cable and pulley system including a series of fixed pulleys, and a cable secured to said trolley and to said tool holder and passing around said fixed pulleys and causing said trolley to track the movements of said tool holder and maintain a position of vertical alignment therewith.

13. The combination with a machine having a vertically movable crossrail and a tool holder slidably disposed on said crossrail and adapted to traverse the latter, of a track disposed above the level of said tool holder when the crossrail is in its uppermost position and overlying the path of movement of the tool holder coextensively, a trolley movably mounted on said track and adapted to traverse the same, a counterweight cable and pulley system including a pulley on said trolley, a counterweight, and a cable passing over said trolley pulley and operatively connected to said counterweight and tool holder, and a trolley draw cable and pulley system including a series of fixed pulleys, a series of pulleys mounted on said crossrail, and a cable secured to said trolley and to said tool holder and passing around said fixed pulleys and the crossrail pulleys for causing said trolley to track the movements of said tool holder and maintain a position of vertical alignment therewith in any vertical position of the crossrail, and means for taking up any slack existing in the cable of said trolley draw system.

14. The combination with a machine having a vertically movable crossrail and a tool holder slidably disposed on said crossrail and adapted to traverse the latter, of a track disposed above the level of said tool holder when the crossrail is in its uppermost position and overlying the path of movement of the tool holder coextensively, a trolley movably mounted on said track and adapted to traverse the same, a counterweight cable and pulley system including a pulley on said trolley, a counterweight, and a cable passing over said trolley pulley and operatively connected to said counterweight and tool holder, a trolley draw cable and pulley system including a series of fixed pulleys, a series of pulleys mounted on said crossrail, a series of pulleys mounted on said trolley, and a cable passing around said series of fixed pulleys, said series of pulleys on the crossrail, and said series of pulleys on the trolley, and secured to said tool holder for causing said trolley to track the movements of said tool holder and maintain a position of vertical alignment therewith.

15. The combination with a machine having a tool holder movable linearly in a horizontal path, of a track disposed above the level of said tool holder and overlying the path of movement of the latter coextensively therewith, a trolley movable on said track and adapted to traverse the same, a counterweight cable and pulley system including a pair of pulleys mounted on said trolley, a suspension pulley mounted on said tool holder, a cable passing over said trolley pulleys and having a suspension loop therebetween passing around said suspension pulley, a pair of counterweights carried by said cable and effective on each side of said trolley pulley to apply equalized tension to said suspension loop, and a trolley draw cable and pulley system including a series of fixed pulleys, and a cable secured to said trolley and to said tool holder and passing around said fixed pulleys for causing said trolley to track the movements of said tool holder and maintain the trolley in a position of vertical alignment with the tool holder.

16. The combination with a machine having a tool holder movable linearly in a horizontal path, of a track disposed above the level of said tool holder and overlying the path of movement of the latter coextensively, a trolley movable on said track and adapted to traverse the same, a counterweight cable and pulley system including a pair of pulleys mounted on said trolley, a supporting pulley mounted on said tool holder, a cable passing over said trolley pulleys and having a suspension loop passing around said supporting pulley, a pair of counterweights carried by said cable and effective on each side of said trolley pulley to apply equalized tension to said suspension loop, and a trolley draw cable and pulley system including a fixed pulley mounted at each end of said track and a cable secured to said trolley and to said tool holder and passing around said fixed pulleys and causing said trolley to track the movements of said tool holder and maintain the trolley in a position of vertical alignment with the tool holder.

17. The combination with a machine including a vertically movable crossrail and a tool holder slidably supported on said crossrail and offset forwardly therefrom and adapted to traverse the same in any vertical position of the crossrail, of means for counterbalancing the weight of said tool holder comprising a track disposed above the level of said tool holder in the uppermost position of the crossrail and overlying the path of movement of the tool holder coextensively, a trolley movable on said track and adapted to traverse the same, a counterweight cable and pulley system including a pair of pulleys mounted on said trolley, a suspension pulley mounted on said tool holder and a cable mounted on said trolley pulley and having a suspension loop therebetween passing around said suspension pulley, and a pair of counterweights carried by said cable and effective on each side of said trolley pulley to apply equalized tension to said loop, and a trolley draw cable and pulley system including a fixed draw pulley and a pair of fixed supporting pulleys mounted adjacent each end of said track, a pair of floating pulleys, and a cable secured to said trolley and to said tool holder and passing over each of said draw pulleys and over each pair of fixed supporting pulleys and providing tension loops therebetween, said tension loops each passing around one of said floating pulleys, and means for applying tension to said floating pulleys to apply substantially equalized tension to said tension loops.

18. The combination with a machine having a tool holder movable linearly in a horizontal path, of a track disposed above the level of said tool holder and overlying the path of movement of the tool holder coextensively therewith, a trolley movable on said track and adapted to traverse the same, a counterweight cable and pulley system including a pair of pulleys mounted on said trolley, a suspension pulley mounted on said tool holder, and a cable passing over said trolley pulleys and having a suspension loop therebetween passing around said suspension pulley, and means effective on each side of said trolley pulleys to apply equalized tension to said suspension loop.

19. The combination with a machine having a tool holder movable linearly in a horizontal path, of a track disposed above the level of said tool holder and overlying the path of movement of the tool holder coextensively therewith, a trolley movable on said track and adapted to traverse the same, a counterweight cable and pulley system including a pair of pulleys mounted on said trolley, a suspension pulley mounted on said tool holder, and a cable passing over said trolley pulleys and having a suspension loop therebetween passing around said suspension pulley, means effective on each side of said trolley pulley to apply equalized tension to said suspension loop, and means operatively connecting the tool holder and trolley in driving relationship for causing the trolley to track the movements of the tool holder.

20. In a machine tool, the combination comprising a pair of spaced vertical columns, a horizontal tool rail secured to the front of the columns for vertical movement therealong, a tool head attached to the front of the rail for horizontal movement therealong, a pair of forwardly extending projections on the upper ends of the respective columns, a horizontal trolley rail connected to the front ends of said projections and supported thereby in overlying relation to the path of movement of the tool head, a trolley movable along the trolley rail, suspension means connecting the tool head to the trolley, and means for tensioning said suspension means for counterbalancing the weight of the tool head.

21. In a machine tool, the combination comprising a pair of spaced vertical columns, a horizontal tool rail secured to the columns for vertical movement therealong, a tool head attached to the rail for horizontal movement therealong, a horizontal trolley rail secured to the upper ends of the columns and overlying the path of movement of the tool head, a trolley movable along the trolley rail, a pair of pulleys mounted on the trolley, a suspension pulley mounted on the tool head, a cable passing around said suspension pulley and over said trolley pulleys to form a suspension loop and then along the trolley rail to the opposite ends thereof, and means for tensioning said cable to counterbalance the weight of the tool head.

22. In a machine having a tool holder movable linearly in a horizontal path, the combination comprising a hollow horizontal beam disposed above the tool holder and overlying the path of movement thereof, said beam being provided with a longitudinal slot, a wheeled trolley inside said beam and movable therealong, and suspension means extending through said slot and between said trolley and said tool holder for constantly applying a counterbalancing force thereto.

23. In a machine having a tool holder movable linearly in a horizontal path, the combination comprising a horizontal track disposed above the tool holder and overlying the path of movement thereof, said track comprising a downwardly open box section beam having a pair of inwardly directed flanges, a wheeled trolley concealed inside said beam and movable along said flanges, pulley means on said trolley, suspension cable means extending upwardly from said tool holder over said pulley means and then along and inside said beam, and means for tensioning said cable means to counterbalance said tool holder.

24. In a machine tool, the combination comprising a pair of hollow columns, a vertically movable crossrail extending therebetween, a tool holder movable in a horizontal path along the crossrail, a hollow horizontal beam extending between the columns and disposed above the tool holder over the path of movement thereof, said beam having a longitudinal slot, a wheeled trolley inside said beam and movable therealong, pulley means on said trolley, suspension cable means extending upwardly from said toool holder, through said slot, over said pulley means and then along and inside said beam, counterweight means inside said columns for tensioning said cable means to counterbalance said tool holder, and trolley draw cable means extending from said trolley inside said beam and then inside said columns, said draw cable means being connected to said tool holder for maintaining the trolley in vertical alinement therewith.

25. In a machine having a saddle movable linearly in a horizontal path and a tool holder mounted on the saddle for linear movement therewith and for swiveling movement thereon about a horizontal axis generally perpendicular to said horizontal path, the combination comprising a generally horizontal track disposed above the tool holder and overlying the path of movement thereof, a trolley movable along said track, suspension means interconnecting said trolley and said tool holder for counterbalancing the weight of the latter, and means for causing the trolley to track the movement of the tool holder including a trolley drawing element movable generally parallel to the horizontal path of the saddle and operatively connected to the trolley, a slide mounted on the saddle for linear horizontal movement relative thereto, said driving element being connected to said slide, and interengaging elements on said slide and said tool holder for moving the slide in accordance with swiveling movement of the holder so as to maintain the suspension means generally vertical.

26. In a machine having a saddle movable linearly in a horizontal path and a tool holder mounted on the saddle for linear movement therewith and for swiveling movement thereon about a horizontal axis generally perpendicular to said horizontal path, the combination comprising a generally horizontal track disposed above the tool holder and overlying the path of movement thereof, a trolley movable along said track, suspension means mounted on said trolley and operatively connected to said tool holder for constantly applying a counterbalancing force thereto, and means for causing the trolley to track the movement of the tool holder, including a draw cable extending generally parallel to the horizontal path of the saddle and operatively connected to the trolley, a slide mounted on the saddle for linear horizontal movement relative thereto, said cable being connected to said slide, a linear vertically oriented guiding element on said slide, and a crank element on said tool support engaging with said guiding element and effective upon swiveling movement of said holder to move said slide in proportion to the horizontal component of movement of said crank element.

27. In a machine having a vertically movable horizontal rail and a tool holder mounted thereon for horizontal movement therealong, the combination comprising a track disposed parallel to the rail above the tool holder, a trolley movable along said track, suspension means interconnecting said trolley and said tool holder for counterbalancing the weight thereof, a trolley draw cable and pulley system for maintaining the trolley in vertical alinement with said tool holder, including cable means having a pair of generally horizontal portions extending respectively from the trolley and the tool holder in opposite directions, and an additional pair of portions extending upwardly and downwardly from said rail respectively, one of said additional pair being drawn in and the other payed out during vertical movement of said rail, all of said portions being operatively interconnected.

28. In a machine having a vertically movable horizontal rail and a tool holder mounted thereon for horizontal movement therealong, the combination comprising a track disposed parallel to the rail above the tool holder, a trolley movable along said track, suspension means interconnecting said trolley and said tool holder for counterbalancing the weight thereof, a trolley draw cable and pulley system for maintaining the trolley in vertical alinement with said tool holder, including a rail pulley on one end of said rail, an upper fixed pulley at the corresponding end of said track, a lower fixed pulley adjacent the lower limit of movement of said rail, and draw cable means having a pair of generally horizontal portions extending respectively in opposite directions from said trolley and said tool holder, a vertical portion extending between said trolley and said tool holder, and an additional interconnecting portion looped around said lower fixed pulley and passing over said rail pulley and said upper fixed pulley, the lengths of said vertical and interconnecting portions being changed equally and oppositely by vertical movement of the rail so that cable tension is maintained.

29. In a machine having a vertically movable horizontal rail and a tool holder mounted thereon for horizontal movement therealong, the combination comprising a track disposed generally parallel to the rail above the tool holder, a trolley movable along said track, suspension means interconnecting said trolley and said holder for counterbalancing the weight of the latter, a trolley draw cable and pulley system for maintaining said trolley in vertical alinement with said tool holder and including cable means comprising a first cable flight extending from said tool holder along said rail in one direction, a second cable flight extending from said trolley along said track in the opposite direction, and a cable portion extending between said rail and said track and connecting said first flight to said second flight for transmitting tension from the former to the latter.

References Cited in the file of this patent

UNITED STATES PATENTS

| Number | Name | Date |
| --- | --- | --- |
| 214,035 | Harrington | Apr. 8, 1879 |
| 995,420 | Bullard | June 13, 1911 |
| 1,477,851 | Root | Dec. 18, 1923 |
| 1,725,059 | Colby | Aug. 20, 1929 |
| 1,958,507 | Avchea | May 15, 1934 |
| 2,073,669 | Zademach | Mar. 16, 1937 |
| 2,111,681 | Torrettini | May 22, 1938 |
| 2,434,613 | Herick | Jan. 13, 1948 |
| 2,464,415 | Philippe | Mar. 15, 1949 |